United States Patent
Scheerder

(10) Patent No.: US 9,435,589 B2
(45) Date of Patent: Sep. 6, 2016

(54) METHOD FOR MANUFACTURING A TUBE SHEET AND HEAT EXCHANGER ASSEMBLY FOR A POOL REACTOR OR POOL CONDENSER; CORRESPONDING TUBE SHEET AND HEAT EXCHANGER ASSEMBLY

(71) Applicant: STAMICARBON B.V., Sittard (NL)

(72) Inventor: Alexander Aleida Antonius Scheerder, Sittard (NL)

(73) Assignee: STAMICARBON B.V., Sittard (NL)

( * ) Notice: Subject to any disclaimer, the term of this patent is extended or adjusted under 35 U.S.C. 154(b) by 0 days.

(21) Appl. No.: 14/398,439

(22) PCT Filed: May 2, 2013

(86) PCT No.: PCT/NL2013/050331
§ 371 (c)(1),
(2) Date: Oct. 31, 2014

(87) PCT Pub. No.: WO2013/165247
PCT Pub. Date: Nov. 7, 2013

(65) Prior Publication Data
US 2015/0086440 A1    Mar. 26, 2015

(30) Foreign Application Priority Data
May 3, 2012 (EP) ..................... 12166584

(51) Int. Cl.
*F28F 9/18* (2006.01)
*B01J 19/02* (2006.01)
(Continued)

(52) U.S. Cl.
CPC .. *F28F 9/18* (2013.01); *B01J 3/04* (2013.01); *B01J 19/006* (2013.01);
(Continued)

(58) Field of Classification Search
None
See application file for complete search history.

(56) References Cited

U.S. PATENT DOCUMENTS 4,288,109 A * 9/1981 Ellis ................. F28F 19/06
285/141.1
5,252,292 A * 10/1993 Hirata ................. G01N 27/126
204/400

(Continued)

FOREIGN PATENT DOCUMENTS

JP        02-085696       3/1990
WO      WO-2008/065478    6/2008
WO      WO-2009/141346    11/2009

OTHER PUBLICATIONS

International Search Report for PCT/NL2013/050331, mailed Jul. 9, 2013, 5 pages.

*Primary Examiner* — Lessanework Seifu
(74) *Attorney, Agent, or Firm* — Morrison & Foerster LLP

(57) ABSTRACT

The present application relates to a method of manufacturing a tube sheet (7) and heat exchanger assembly for a pool reactor or pool condenser for use in the production of urea from ammonia and carbon dioxide, wherein the method comprises manufacturing of the tube sheet (7) from a carbon steel material grade and providing said tube sheet (7) with corrosion protective layers (8, 9) of an austenitic-ferritic duplex stainless steel grade, wherein the heat exchanger comprises at least one U-shaped tube (13) of an austenitic-ferritic duplex stainless steel grade, the method further comprises inserting at least two sleeves (11) of an austenitic-ferritic duplex stainless steel grade through the tube sheet (7) such that both ends of the sleeve (11) extend in a direction away from the tube sheet (7), the method further comprises connecting the sleeves (11), at least the opposing ends thereof, to at least the protective layers (8,9) of the tube sheet (7) and finally, connecting both ends of the at least one U-shaped tube (13) to the respective sleeves (11).

22 Claims, 3 Drawing Sheets

(51) Int. Cl.
  *B21D 53/08* (2006.01)
  *B23K 31/02* (2006.01)
  *F28F 19/06* (2006.01)
  *F28F 21/08* (2006.01)
  *F28D 7/06* (2006.01)
  *B01J 19/00* (2006.01)
  *B01J 19/24* (2006.01)
  *B01J 3/04* (2006.01)
  *F28D 21/00* (2006.01)

(52) U.S. Cl.
  CPC .......... *B01J 19/0013* (2013.01); *B01J 19/02* (2013.01); *B01J 19/24* (2013.01); *B21D 53/08* (2013.01); *B23K 31/027* (2013.01); *F28D 7/06* (2013.01); *F28F 9/185* (2013.01); *F28F 19/06* (2013.01); *F28F 21/083* (2013.01); *B01J 2219/00081* (2013.01); *B01J 2219/00256* (2013.01); *B01J 2219/00768* (2013.01); *B01J 2219/024* (2013.01); *B01J 2219/0286* (2013.01); *B01J 2219/192* (2013.01); *B23K 2201/14* (2013.01); *B23K 2203/04* (2013.01); *B23K 2203/18* (2013.01); *F28D 2021/0022* (2013.01); *Y02P 20/142* (2015.11); *Y10T 29/49373* (2015.01); *Y10T 29/49968* (2015.01)

(56) References Cited

U.S. PATENT DOCUMENTS

2003/0066868 A1   4/2003   Eijkenboom et al.
2006/0073086 A1   4/2006   Sakai et al.

\* cited by examiner

METHOD FOR MANUFACTURING A TUBE SHEET AND HEAT EXCHANGER ASSEMBLY FOR A POOL REACTOR OR POOL CONDENSER; CORRESPONDING TUBE SHEET AND HEAT EXCHANGER ASSEMBLY

CROSS-REFERENCE TO RELATED APPLICATIONS

This application is the national phase of PCT application PCT/NL2013/050331 having an international filing date of 2 May 2013, which claims benefit of European patent application No. 12166584.8 filed 3 May 2012. The contents of the above patent applications are incorporated by reference herein in their entirety.

FIELD OF THE INVENTION

The present invention relates to the field of the production of urea from ammonia and carbon dioxide in a urea plant containing a high-pressure synthesis section. In particular the invention relates to the field of manufacturing a tube sheet and heat exchanger assembly for a pool reactor or pool condenser for the production of urea from ammonia and carbon dioxide in a urea plant.

BACKGROUND

For the production of urea and carbon dioxide in a urea plant, such a plant may comprise a high pressure stripper, a high pressure carbamate condenser, pool condenser or pool reactor. Such a pool condenser or pool reactor may be of the shell and tube type comprising substantially u-shaped tube bundles extending through a tube sheet. Such a urea plant is for instance described in WO 2009/141346. The shell side of the known pool reactor or pool condenser is filled with high pressure process medium. The U-shaped tube bundle provided in the reactor or condenser is filled with steam condensate for generating low pressure steam. Since a high pressure difference between the shell side and the tube side is present, the tube sheet has to be designed strong enough to withstand the pressure difference between both sides. Besides, for manufacturing of such a pool reactor or pool condenser, each U-shaped tube of the bundle has to be connected to the tube sheet of the reactor or condenser. Due to the U-shape of the tube, connecting of each tube to the tube sheet comprises a difficult and time consuming operation which makes the reactor or condenser difficult to construct. All the more since each U-shaped tube bundle comprises multiple tubes, for instance approximately 500 to 5000, preferably 1000-4000, more preferably 1500-3000 tubes. Consequently, due to the difficult construction, manufacturing costs of such pool reactor or pool condenser are high.

Therefore, it is an object of the present invention to provide an improved method for manufacturing of such pool reactor or pool condenser for use in a urea plant to produce urea. More in particular an object of the invention is to provide a method for manufacturing a tube sheet and heat exchanger assembly for such pool reactor or pool condenser that enables connection of the respective tubes to the tube sheet in an efficient manner.

SUMMARY OF THE INVENTION

According to one aspect of the invention a method for manufacturing a tube sheet and heat exchanger assembly for a shell and tube type heat exchanger such as a pool reactor or pool condenser for use in an apparatus for the production of urea from ammonia and carbon dioxide is provided. The method comprises manufacturing of the tube sheet from a carbon steel material grade and providing said tube sheet, on a shell side and a tube side thereof, with a corrosion protective layer of an austenitic-ferritic duplex stainless steel grade. The heat exchanger comprises at least one U-shaped tube of an austenitic-ferritic duplex stainless steel grade. The method further comprises inserting at least two sleeves of an austenitic-ferritic duplex stainless steel grade through the tube sheet such that both ends of the sleeve extend in a direction away from the tube sheet. The method comprises connecting the sleeves, at least the opposing ends thereof, to at least the protective layers of the tube sheet and then connecting both ends of the at least one U-shaped tube to the respective ends of the sleeves. With such a method according to the invention, connecting of the U-shaped tubes of the bundle comprises two steps. By first inserting sleeves into the tube sheet, connecting of the sleeves at both ends thereof to the protective layers provided on both surfaces of the tube sheet, is relatively simple. After all, both ends of the sleeves can be reached easily, in contrary to when the U-shaped tubes need to be connected to the tube sheet directly. Connecting of the ends of the U-shaped tubes to the ends of the sleeves can be obtained relatively simple as well. To connect the ends of a U-shaped tube to the ends of the sleeves, the ends of the U-shaped tube are positioned against the respective ends of the sleeves such that both tubes of the U-shaped tube are in line with the respective sleeves. Subsequently, the respective ends of the sleeves and ends of the tubes are interconnected, for instance by means of internal bore welding.

By manufacturing the tube sheet of a carbon steel material grade and the sleeves, to be inserted in said tube sheet, of an austenitic-ferritic duplex stainless steel material grade, problems of heat expansion during use of the pool reactor or pool condenser can be prevented. Since the coefficient of thermal expansion of the austenitic-ferritic duplex stainless steel material grade is approximately the same as the coefficient of thermal expansion of the carbon steel material grade, connecting of the sleeves to the tube sheet of carbon steel material grade comprising two outer layers of austenitic-ferritic stainless steel material grade can be obtained without the risk of product failure upon increasing temperatures during the production of urea. Especially, during start-up and shut-down of thermal cycles in the pool reactor or pool condenser, minimal thermal stresses in the seal welds occur due to this specific construction.

Furthermore, due to the construction of the tube sheet of carbon steel material grade and the corrosion protective layers of austenitic-ferritic duplex stainless steel grade connected thereto, the heat history of the tube sheet is equal along the entire thickness of the tube sheet. This would however not be possible in case the entire tube sheet would be manufactured from the austenitic-ferritic duplex stainless steel grade. Besides, with a thickness of more than 300 mm, a tube sheet of solely austenitic-ferritic duplex stainless steel can not be forged to have the proper corrosion resistance over the entire thickness, thus also inside the hole extending though the entire tube sheet. Furthermore, this would be an expensive alternative.

By first welding the sleeves to the corrosion protective layers and subsequently interconnecting the U-shaped tubes to the ends of the sleeves, the tube sheet is completely enclosed by corrosion protective material. No crevices are present between the respective parts of the tube sheet and heat exchanger assembly. This is of importance because in a production process of the production of urea from ammonia and carbon dioxide, the pool reactor or pool condenser used in said process is exposed to an extremely corrosive medium. Even materials with an extremely high corrosion resistance will be susceptible to crevice corrosion in case of stagnant corrosive fluid in any crevice between the tube and the tube sheet. Consequently, due to the construction of the tube sheet and heat exchanger assembly according to the invention crevice corrosion is avoided.

Preferably, the protective layers on the tube sheet are formed of an austenitic-ferritic duplex stainless steel grade with a chromium content of between 26-35 weight % an a nickel content of between 3 and 10 weight %. This same material may be used to form the sleeves. Also the U-shaped tubes of the bundles may be manufactured of said austenitic-ferritic duplex stainless steel grade with a chromium content of between 26-35 weight % an a nickel content of between 3 and 10 weight %.

Preferably, the thickness of the tube sheet is approximately between 200-700 mm, such that in use a prevailing pressure difference between the shell side and the tube side of the tube sheet can be resisted.

To provide a proper connection between the sleeves and both protective layers of the tube sheet, the sleeves may be seal welded at both sides of the tube sheet, to the protective layers provided thereon, to avoid corrosive process medium to enter in a crevice between the sleeves and the respective carbon-steel tube bore holes. Subsequently, the tubes of the respective U-shaped tubes may be welded to the respective sleeves, at least to the ends thereof extending from the tube sheet, in use, towards the shell side of the pool reactor or pool condenser. The U-shaped tubes may be welded to the sleeves by means of internal bore welding. Therefore, a welding probe may be inserted in the sleeve and tube and entered through the sleeve into the tube from the tube side of the tube sheet.

With the method according to the invention, a tube sheet and heat exchanger assembly can be provided that can be used to advantage in a pool reactor or pool condenser comprising a second heat exchanger as well. Therefore, the method according to a further aspect of the invention may comprise connecting a second heat exchanger to the tube sheet, wherein the second heat exchanger also comprises a substantially U-shaped tube bundle. Such a pool reactor or pool condenser may for instance be configured for exchanging heat by means of the first heat exchanger from a high pressure process medium received in a shell section of the pool reactor or pool condenser to a medium pressure urea containing solution received in a first heat exchanging section provided in the pool condenser or pool reactor to at least decompose ammonium carbamate into $NH_3$ and $CO_2$ and for exchanging heat by means of the second heat exchanger from the high pressure process medium to a low pressure steam condensate received in a second heat exchanging section provided in the pool reactor or pool condenser to produce low pressure steam. In such a pool reactor or pool condenser, corrosive process medium is present at the shell side as well as at the tube side of the tube sheet. Due to the weld connection of the sleeves to both corrosion protective layers of the tube sheet, corrosive process medium is prevented from contacting the carbon steel material grade of the tube sheet.

To enable insertion of the at least one sleeve in the tube sheet, the tube sheet including the corrosion protective layers may be provided with bore holes for receiving the respective sleeves, wherein the method comprises inserting said sleeve into the respective bore holes to protect the carbon steel material grade of the bore hole surfaces from the corrosive process media.

According to a further aspect of the invention, the tube sheet is provided with a leak detection system. Preferably, the leak detection system is operatively coupled to the crevices between the sleeves and the respective tube bore holes and to a leak detector, such as an ammonia detector. With such a leak detection system corrosive medium either from the shell side or from the tube side that accidentally enters the crevice between the sleeve and the core of the tube sheet, thus becoming in contact with the carbon steel, can be detected. Upon detection of presence of corrosive media in such a crevice, immediate corrective actions may be taken to avoid severe damages of the carbon steel tube sheet due to corrosion by the process medium. Preferably, all crevices between the sleeves and the respective bore holes in the tube sheet are interconnected and connected via a tube to an ammonia detector. Upon leakage of the corrosive process medium (i.e. ammonium carbamate), said medium will enter the crevice and will decompose amongst other components into ammonia and is directly detected by the ammonia detector.

The invention also relates to a tube sheet and heat exchanger assembly for a shell and tube type pool reactor or pool condenser configured to exchange heat between a first process medium received in a shell side of the reactor to a second process medium received in a heat exchanger extending through the tube sheet and extending at least partly in the shell side of the reactor or condenser, the assembly preferably manufactured by using the above described method wherein the tube sheet comprises a carbon steel material grade and is provided, preferably on both sides thereof, with a corrosion protective layer of an austenitic-ferritic duplex stainless steel grade, wherein the heat exchanger comprises at least one U-shaped tube of an austenitic-ferritic duplex stainless steel grade, wherein at least two sleeves extend through the tube sheet, which sleeves, at least opposing ends thereof, are connected to the respective corrosion resistant protective layers and wherein the U-shaped tube, at least both ends thereof, are connected to the respective sleeve ends.

Finally, the invention also relates to a pool reactor or pool condenser, preferably a submerged pool reactor or pool condenser, at least comprising the above mentioned tube sheet and heat exchanger assembly with a first and a second U-shaped bundle and preferably manufactured by using the above described method.

The tube sheet and heat exchanger assembly and the pool reactor or pool condenser according to the invention have similar advantages and effects as described with the method according to the invention.

The aforementioned and other features and advantages of the invention will be more fully understood from the following detailed description of certain embodiments of the invention, taken together with the accompanying drawings, which are meant to illustrate and not to limit the invention.

BRIEF DESCRIPTION OF THE DRAWINGS

It is noted that identical or corresponding elements in the different drawings are indicated with identical or corresponding reference numerals.

DETAILED DESCRIPTION

Figure 1:
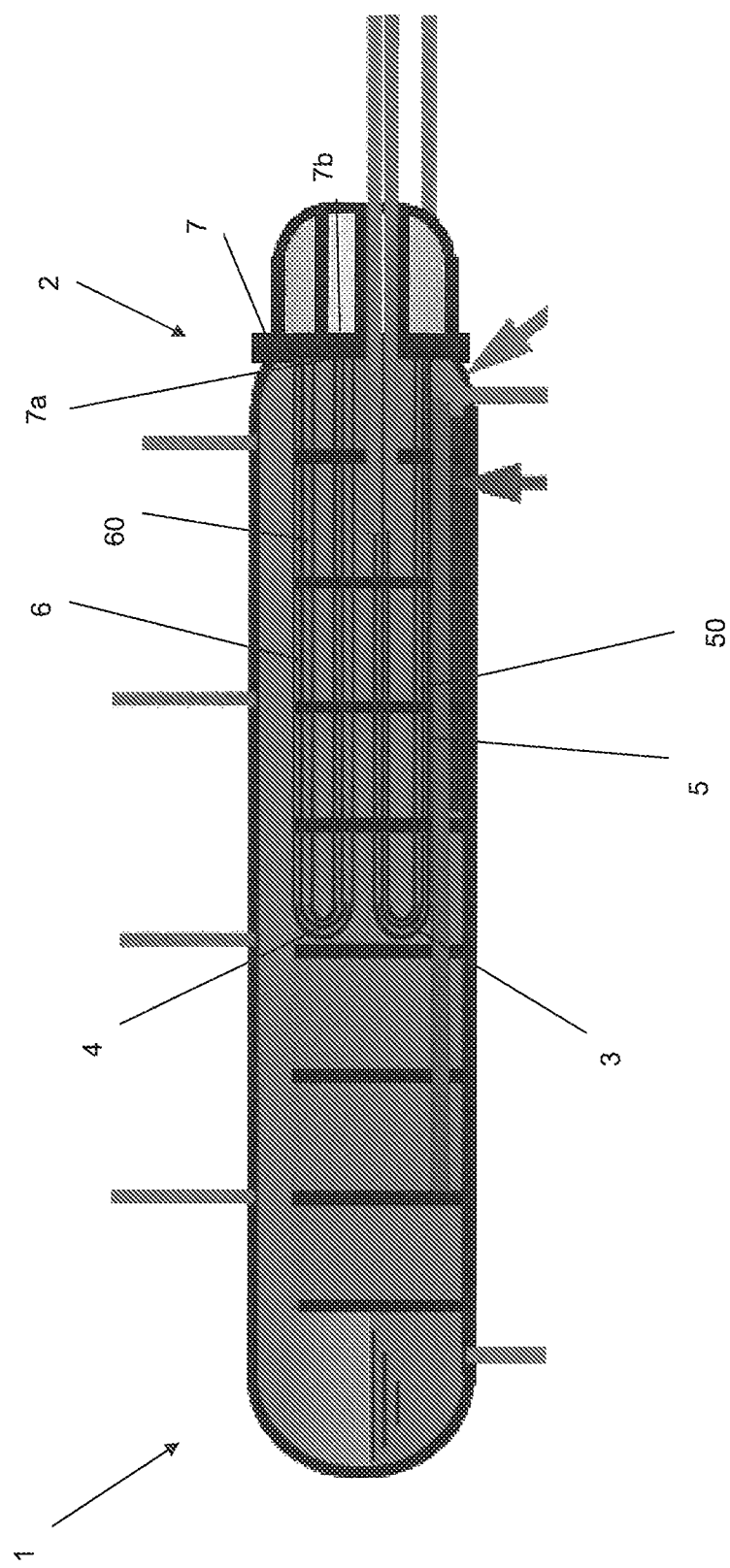
FIG. 1 shows a schematic view of a pool reactor according to an embodiment of the invention.

In FIG. 1, an example of a pool reactor 1 according to an embodiment of the invention is shown. Such a pool reactor may be used in a urea plant for the production of urea from ammonia and carbon dioxide in a urea plant. The pool reactor 1 may be a shell and tube heat exchanger. Such a heat exchanger may be used as a pool reactor or a pool condenser, for instance as a horizontal submerged reactor or condenser. The pool reactor 1 comprises a vessel, which in use, is placed substantially horizontally, with a first heat exchanging section 3 and a second heat exchanging section 4. In the shown embodiment, both heat exchanging sections 3, 4 comprise a substantially U-shaped tube bundle 5, 6. The first U-shaped tube bundle 5 is configured for condensation of carbamate and for subsequently decomposing of ammonium carbamate into $NH_3$ and $CO_2$ by means of the heat that is released during said condensation.

The second U-shaped tube bundle 6 is configured to produce low pressure steam. Both U-shaped tube bundles 5, 6 extend from the tube sheet 7 of the pool condenser 1 at least partly through an inner space defined by the shell of the pool reactor 1.

The U-shaped tube bundles 5, 6 together with the tube sheet 7 form a tube sheet and heat exchanger assembly 2. The tube sheet 7 is manufactured from a carbon steel material grade and comprises on both outer surfaces 7a, 7b thereof a corrosion protective layer 8, 9 (see FIGS. 2 and 3). The corrosion protective layers 8, 9 are made from an austenitic-ferritic duplex stainless steel grade. The thickness t of the tube sheet 7 may be approximately between 200 and 700 mm. In the shown example, the tube sheet 7 comprises a carbon steel material grade layer having a thickness of approximately 650 mm and two corrosion protective layers 8, 9 having a thickness of between 4-35 mm each, for instance approximately 25 mm each. Bore holes 10 extend through the tube sheet 7, along the entire thickness thereof. In the bore holes 10 sleeves 11 are inserted. The sleeves 11 are also from an austenitic-ferritic duplex stainless steel grade and are connected by means of a weld connection 12 to the respective corrosion protective layers. The U-shaped tubes 50, 60, at least the ends thereof, of the respective bundles 5, 6 are connected to the ends of the sleeves 11 that extend from the tube sheet 7 in a direction towards the shell of the pool reactor 1 (see FIG. 3). After connection of the respective U-shaped tubes 50, 60 to the ends of the respective sleeves 11, the legs of the tubes 50. 60, i.e. the end parts of the tubes that face away from the U-shaped section of the tubes 50, 60 are in line with the respective sleeves 11. In different words, after connection of the respective U-shaped tubes 50, 60 to the ends of the respective sleeves 11, the U-shaped tubes 50, 60 and the sleeves 11 extend from the connection in opposing directions.

Figure 2:
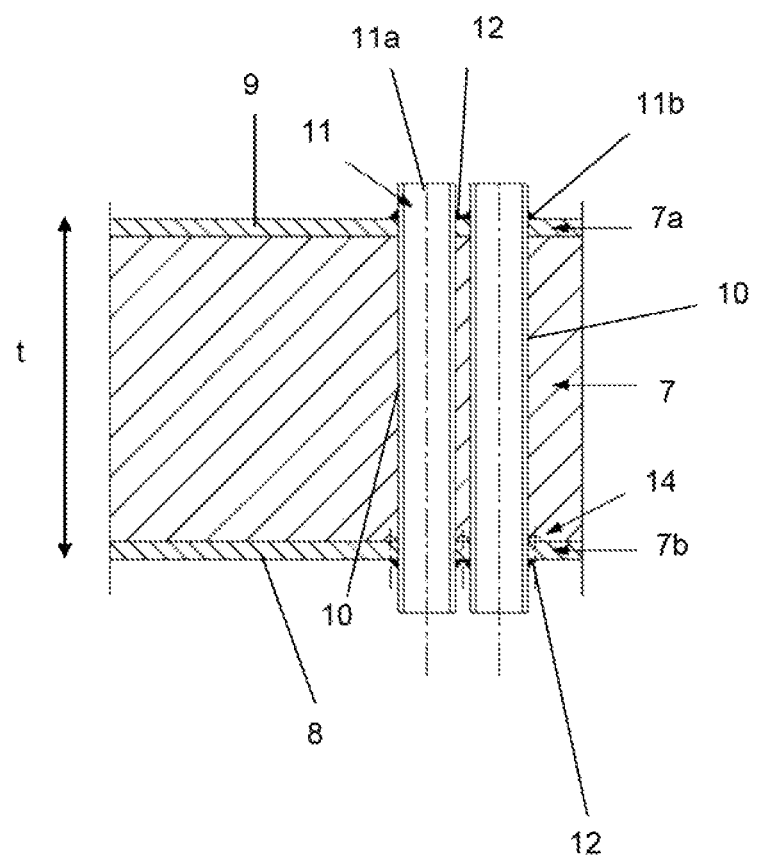
FIGS. 2 and 3 show schematic views of a tube sheet and heat exchanger assembly according to an embodiment of the invention.
Figure 3:
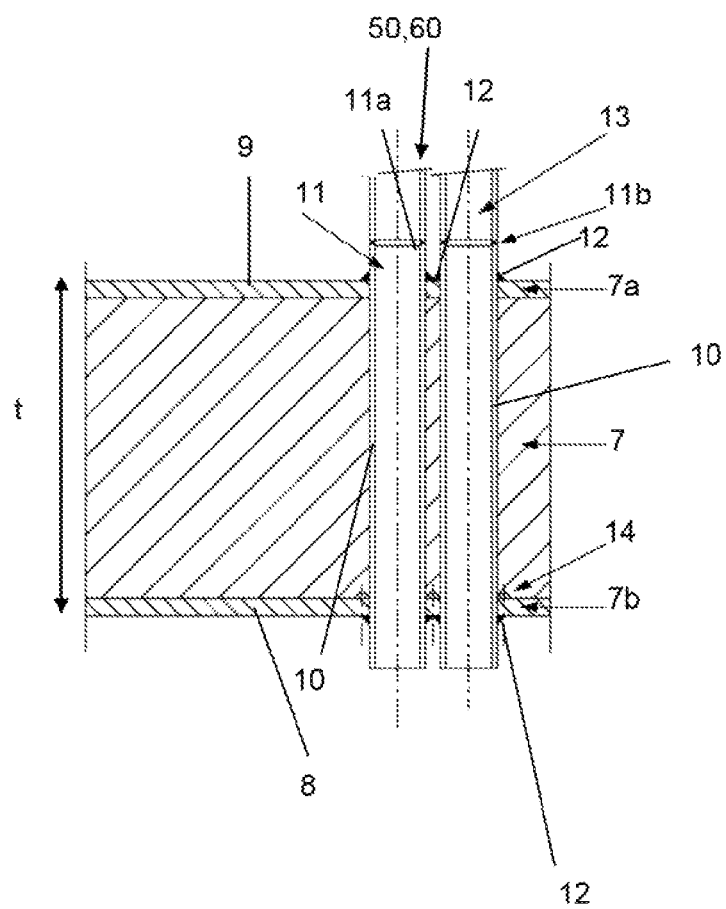

The tube sheet and heat exchanger assembly 2 is manufactured by means of the method according to the invention. Referring to FIGS. 2 and 3, the method will be described.

The tube sheet 7 is manufactured from a carbon steel material grade and provided with a corrosion protective layer 8, 9 on both surfaces thereof. Holes 10 are provided through the entire thickness t of the tube sheet 7. Sleeves 11 having a length of between 250-750 mm are inserted in the bore holes 10 such that both sleeve ends 11a, 11b of the sleeves 11 extend from the outer surface of the respective corrosion protective layer 8, 9 away from the tube sheet 7. The protective layers 8, 9 as well as the sleeves 11 are manufactured from an austenitic-ferritic duplex stainless steel grade. Preferably, the austenitic ferritic duplex stainless steel grade has a chromium content of between 26-35 weight % and a nickel content of between 3 and 10 weight % to provide for the desired corrosion protective properties. The sleeves 11 are seal welded to the outer surfaces of the respective corrosion protective layers, as is clearly visible in FIGS. 2 and 3. Since the opposing ends of the sleeves 11 only extend a few centimeters from the outer surface of the tube sheet 7, providing a seal weld connection 12 between the sleeves 11 and the tube sheet 7 may be obtained easily. After all, the respective U-shaped tubes 50, 60 of the respective bundles 5, 6 are not provided adjacent the tube sheet 7 yet.

After seal welding the sleeves 11 to the respective outer layers 8, 9 of the tube sheet 7, the U-shaped tubes 50, 60 of the respective tube bundles 5, 6, at least the ends thereof, are welded to the respective ends of the sleeves 11, for instance by means of internal bore welds 13 (see FIG. 3). Therefore, the ends of the U-shaped tubes 50, 60 positioned against the ends of the sleeves such that the respective ends abut against each other.

During manufacturing of the tube sheet and heat exchanger assembly 2, the tube sheet 7 may be provided with a leak detection system. The leak detection system may comprise leak detection grooves 14 (see FIGS. 2 and 3) that are provided underneath at least the corrosion protective layer 8 provided on the tube side of the tube sheet 7. The leak detection grooves 14 are operatively coupled to a leak detector, such as an ammonia detector (not shown). Upon leakage of the seal weld connections 12, the detector detects the presence of the corrosive process medium by detecting ammonia that is formed due to decomposition of the process medium.

Due to the corrosion protective layers 8, 9, and the sleeves 11, the carbon steel material grade part of the tube sheet 7 is protected from contact with corrosive process media that in use are present on the shell side and the tube side of the tube sheet 7 (see FIG. 1).

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims.

Reference throughout this specification to "one embodiment" or "an embodiment" means that a particular feature, structure or characteristic described in connection with the embodiment is included in at least one embodiment in the present invention. Thus, the appearances of the phrases "in one embodiment" or "in an embodiment" in various places throughout this specification are not necessarily all referring to the same embodiment. Furthermore, it is noted that particular features, structures or characteristics of one or more embodiments may be combined in any suitable manner to form new, not explicitly described embodiments.

The invention claimed is:
1. Method for manufacturing a tube sheet and heat exchanger assembly for a shell and tube type heat exchanger, for use in an apparatus for the production of urea from ammonia and carbon dioxide, wherein the method comprises:

manufacturing the tube sheet from a carbon steel material grade and providing said tube sheet, on a shell side and a tube side thereof, with a corrosion protective layer of an austenitic-ferritic duplex stainless steel grade, wherein the heat exchanger comprises at least one U-shaped tube of an austenitic-ferritic duplex stainless steel grade;

inserting at least two sleeves of an austenitic-ferritic duplex stainless steel grade through the tube sheet such that both ends of the sleeve extend in a direction away from the tube sheet;

connecting the sleeves, at least the opposing ends thereof, to at least the protective layers of the tube sheet;

welding both ends of the at least one U-shaped tube to the respective ends of the sleeves extending from the shell side of the tube sheet.

2. Method according to claim 1, wherein the protective layers are formed of an austenitic-ferritic duplex stainless steel grade with a chromium content of between 26-35 weight % and a nickel content of between 3 and 10 weight %.

3. Method according to claim 1 wherein the sleeves are made from an austenitic-ferritic duplex stainless steel grade with a chromium content of between 26-35 weight % and a nickel content of between 3 and 10 weight %.

4. Method according to claim 1, wherein the thickness of the tube sheet is approximately between 200-700 mm, such that in use a prevailing pressure difference between the shell side and the tube side of the tube sheet can be resisted.

5. Method according to claim 1, wherein the sleeves are seal welded at both sides of the tube sheet, at least to the protective layers provided thereon, to avoid corrosive process medium to enter in a crevice between the sleeves and respective carbon-steel tube bore holes.

6. Method according to claim 1, wherein the method comprises connecting a second heat exchanger to the tube sheet, wherein the second heat exchanger comprises a substantially U-shaped tube bundle.

7. Method according to claim 1, wherein the method comprises providing the tube sheet including the corrosion protective layers with bore holes for receiving the respective sleeves, wherein the method comprises inserting said sleeve into the respective bore holes to protect the carbon steel material grade of the bore hole surfaces from the corrosive process media.

8. Method according to claim 1, wherein the tube sheet is provided with a leak detection system.

9. Method according to claim 8, wherein the leak detection system is operatively coupled to the crevices between the sleeves and the respective tube bore holes and to a leak detector.

10. The method of claim 1 wherein the tube sheet and heat exchanger is a pool reactor or pool condenser.

11. The method of claim 1 wherein the bundles are welded by internal bore welds to the respective sleeves.

12. The method of claim 9 wherein the leak detector is an ammonia detector.

13. The method of claim 1 wherein the ends of the U-shaped tubes are positioned against the ends of the sleeves such that their respective ends abut against each other.

14. Tube sheet and heat exchanger assembly for a shell and tube type pool reactor or pool condenser configured to exchange heat between a first process medium received in a shell side of the reactor or condenser to a second process medium received in a heat exchanger extending through the tube sheet and extending at least partly in the shell side of the reactor or condenser, wherein the tube sheet comprises a carbon steel material grade and is provided, on both sides thereof, with a corrosion protective layer of an austenitic-ferritic duplex stainless steel grade, wherein the heat exchanger comprises at least one U-shaped tube of an austenitic-ferritic duplex stainless steel grade, wherein at least two sleeves extend through the tube sheet, which sleeves, at least opposing ends thereof, are connected to the respective corrosion resistant protective layers and wherein the U-shaped tube, at least both ends thereof, are welded to the respective sleeve ends extending from the shell side of the tube sheet, wherein said assembly is manufactured by the method of claim 1.

15. Tube sheet and heat exchanger assembly for a shell and tube type pool reactor or pool condenser configured to exchange heat between a first process medium received in a shell side of the reactor or condenser to a second process medium received in a heat exchanger extending through the tube sheet and extending at least partly in the shell side of the reactor or condenser, wherein the tube sheet comprises a carbon steel material grade and is provided, on both sides thereof, with a corrosion protective layer of an austenitic-ferritic duplex stainless steel grade, wherein the heat exchanger comprises at least one U-shaped tube of an austenitic-ferritic duplex stainless steel grade, wherein at least two sleeves extend through the tube sheet, which sleeves, at least opposing ends thereof, are connected to the respective corrosion resistant protective layers and wherein the U-shaped tube, at least both ends thereof, are welded to the respective sleeve ends extending from the shell side of the tube sheet.

16. Tube sheet and heat exchanger assembly according to claim 15, wherein the heat exchanger of the assembly comprising a first and a second U-shaped tube bundle.

17. Tube sheet and heat exchanger assembly according to claim 16, wherein the tube sheet comprises bore holes for receiving tubes of the respective U-bundles, wherein protective sleeves extend through the respective bore holes to, in use, avoid corrosion between the sleeves and the bore holes.

18. Tube sheet and heat exchanger assembly according to claim 15, wherein the protective layers provided on the tube sheet, and/or the sleeves provided in the bore holes, are of an austenitic-ferritic duplex stainless steel grade with a chromium content of between 26-35 weight % and a nickel content of between 3 and 10 weight %.

19. Tube sheet and heat exchanger assembly according to claim 15, wherein the tube sheet is provided with a leak detection system.

20. Pool reactor or pool condenser, at least comprising a tube sheet and heat exchanger assembly with a first and a second U-bundle according to claim 15.

21. The pool reactor or pool condenser of claim 20, wherein the pool reactor or pool condenser is horizontal.

22. The tube sheet and heat exchanger assembly of claim 15 wherein the ends of the U-shaped tubes are positioned against the ends of the sleeves such that their respective ends abut against each other.

* * * * *